United States Patent
Lu et al.

(10) Patent No.: US 10,129,967 B2
(45) Date of Patent: Nov. 13, 2018

(54) INNER STATIC ELECTRICITY ELIMINATING CONTROL VALVE FOR ORGANIC SOLVENT DELIVERY PIPELINES

(71) Applicant: MARKETECH INTERNATIONAL CORP., Taipei (TW)

(72) Inventors: Chien-Kuo Lu, Taipei (TW); Hui-Hua Tien, Taipei (TW); Chi-Yuan Pung, Taipei (TW)

(73) Assignee: MARKETECH INTERNATIONAL CORP., Taipei (TW)

( * ) Notice: Subject to any disclaimer, the term of this patent is extended or adjusted under 35 U.S.C. 154(b) by 271 days.

(21) Appl. No.: 15/204,334

(22) Filed: Jul. 7, 2016

(65) Prior Publication Data

US 2017/0127503 A1    May 4, 2017

(30) Foreign Application Priority Data

Oct. 30, 2015    (TW) .............................. 104217386 A

(51) Int. Cl.
*H05F 3/02*    (2006.01)
*F04B 9/127*    (2006.01)
*F04B 7/02*    (2006.01)
*F04B 15/00*    (2006.01)
(Continued)

(52) U.S. Cl.
CPC ................ *H05F 3/02* (2013.01); *F04B 7/02* (2013.01); *F04B 9/127* (2013.01); *F04B 9/1276* (2013.01);
(Continued)

(58) Field of Classification Search
CPC .......... F04B 7/02; F04B 9/127; F04B 9/1276; F04B 15/00; F04B 19/22; F04B 53/108
See application file for complete search history.

(56) References Cited

U.S. PATENT DOCUMENTS 5,159,523 A * 10/1992 Claassen .............. B67D 7/3236
340/649
5,421,767 A *  6/1995 Spears, Jr. ................ B24C 5/04
451/101

(Continued)

FOREIGN PATENT DOCUMENTS

CN    205244650    *  5/2016
DE      3221258    * 12/1983

*Primary Examiner* — Charles Freay
(74) *Attorney, Agent, or Firm* — Egbert Law Offices, PLLC

(57) ABSTRACT

An inner static electricity eliminating control valve for organic solvent delivery pipelines is disclosed. The inner static electricity eliminating control valve is to be installed on and connected to an organic solvent delivery pipeline, to eliminate the inner static electricity generated by the organic solvent inside the organic solvent delivery pipeline. The inner static electricity eliminating control valve includes a valve casing, a main valve chamber, a pneumatic valve, a subsidiary valve chamber, a check valve, a static electricity export mechanism and a solvent export portion, wherein, the pneumatic valve can periodically apply pressure toward the organic solvent inside the main valve chamber, so that the organic solvent inside the main valve chamber can be delivered periodically through the check valve to the subsidiary valve chamber, and during this process, the static electricity export mechanism will export and eliminate the static electricity existing in the organic solvent.

5 Claims, 5 Drawing Sheets

(51) Int. Cl.
*F04B 19/04* (2006.01)
*F04B 19/22* (2006.01)
*F04B 49/00* (2006.01)
*F04B 49/10* (2006.01)
*F04B 53/10* (2006.01)
*F16K 15/02* (2006.01)
*F16K 31/12* (2006.01)
*F16K 51/00* (2006.01)

(52) U.S. Cl.
CPC .............. *F04B 15/00* (2013.01); *F04B 19/04* (2013.01); *F04B 19/22* (2013.01); *F04B 49/00* (2013.01); *F04B 49/10* (2013.01); *F04B 53/10* (2013.01); *F16K 15/026* (2013.01); *F16K 31/12* (2013.01); *F16K 51/00* (2013.01); *H05F 3/025* (2013.01)

(56) References Cited

U.S. PATENT DOCUMENTS

| | | | | |
|---|---|---|---|---|
| 5,518,542 | A * | 5/1996 | Matsukawa | B08B 1/007 118/232 |
| 5,807,079 | A * | 9/1998 | Wilson | F04B 17/00 235/415 |
| 5,932,011 | A * | 8/1999 | Noakes | B05B 5/0255 118/300 |
| 6,129,322 | A * | 10/2000 | Merkl | B67D 7/0205 248/213.2 |
| 8,905,058 | B2 * | 12/2014 | Goodson | F17D 5/08 137/78.1 |
| 8,944,088 | B2 * | 2/2015 | Gilmer | F16K 17/406 137/68.11 |
| 2017/0056909 | A1 * | 3/2017 | Kinne | B05B 5/1675 |

* cited by examiner

INNER STATIC ELECTRICITY ELIMINATING CONTROL VALVE FOR ORGANIC SOLVENT DELIVERY PIPELINES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a static electricity eliminating structure, and more particularly to an innovative structural design of an inner static electricity eliminating control valve for organic solvent delivery pipelines.

2. Description of Related Art Including Information Disclosed Under 37 CFR 1.97 and 37 CFR 1.98

At present, the central chemical supply systems and equipment used by most technical manufacturers are facing risks and dangers because, when supplying high-resistance, inflammable, and explosive chemicals, a large amount of static electricity will be generated due to friction during the flow of organic solvent inside the delivery pipeline. When such static electricity is accumulated to a certain high intensity, there might be risks and dangers of breakdown, spark, ignition or explosion.

If the above-mentioned solvent delivery pipeline is made of stainless steel pipes, the metal material itself will conduct the triboelectricity generated during the flow of liquid. However, there are many different kinds of organic solvent liquids to be delivered by the pipelines, and some special liquids may develop chemical actions with the stainless steel material of the pipeline and cause qualitative change. Hence, some manufacturers are changing to Teflon pipes. Adoption of this kind of pipes can solve the above problem, but will derive another problem. Because Teflon pipes are not conductors, they can not eliminate the static electricity generated during the delivery of liquid. Hence, the afore-mentioned risks and dangers of breakdown, flashover, spark, ignition or explosion will still happen when the inner static electricity is accumulated.

Thus, to overcome the aforementioned problems of the prior art, it would be an advancement in the art to provide an improved structure that can significantly improve the efficacy.

Therefore, the inventors have provided the present invention of practicability after deliberate design and evaluation based on years of experience in the production, development and design of related products.

BRIEF SUMMARY OF THE INVENTION

The "inner static electricity eliminating control valve for organic solvent delivery pipelines" disclosed in the present invention mainly comprises a valve casing, a main valve chamber, a pneumatic valve, a subsidiary valve chamber, a check valve, a static electricity export mechanism, and a solvent export portion. Based on such an innovative and unique structural design and technical characteristics, the present invention achieves an inventive step upon the existing structures proposed in "prior art". Based on the present invention, the pneumatic valve can periodically apply a pressure toward the organic solvent inside the main valve chamber, so that the organic solvent inside the main valve chamber can be periodically delivered through the check valve to the subsidiary valve chamber, and during this process, the static electricity export mechanism can export and eliminate the static electricity in the organic solvent. Hence, the present invention has achieved an inventive step to effectively eliminate the inner static electricity inside the organic solvent delivery pipeline.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
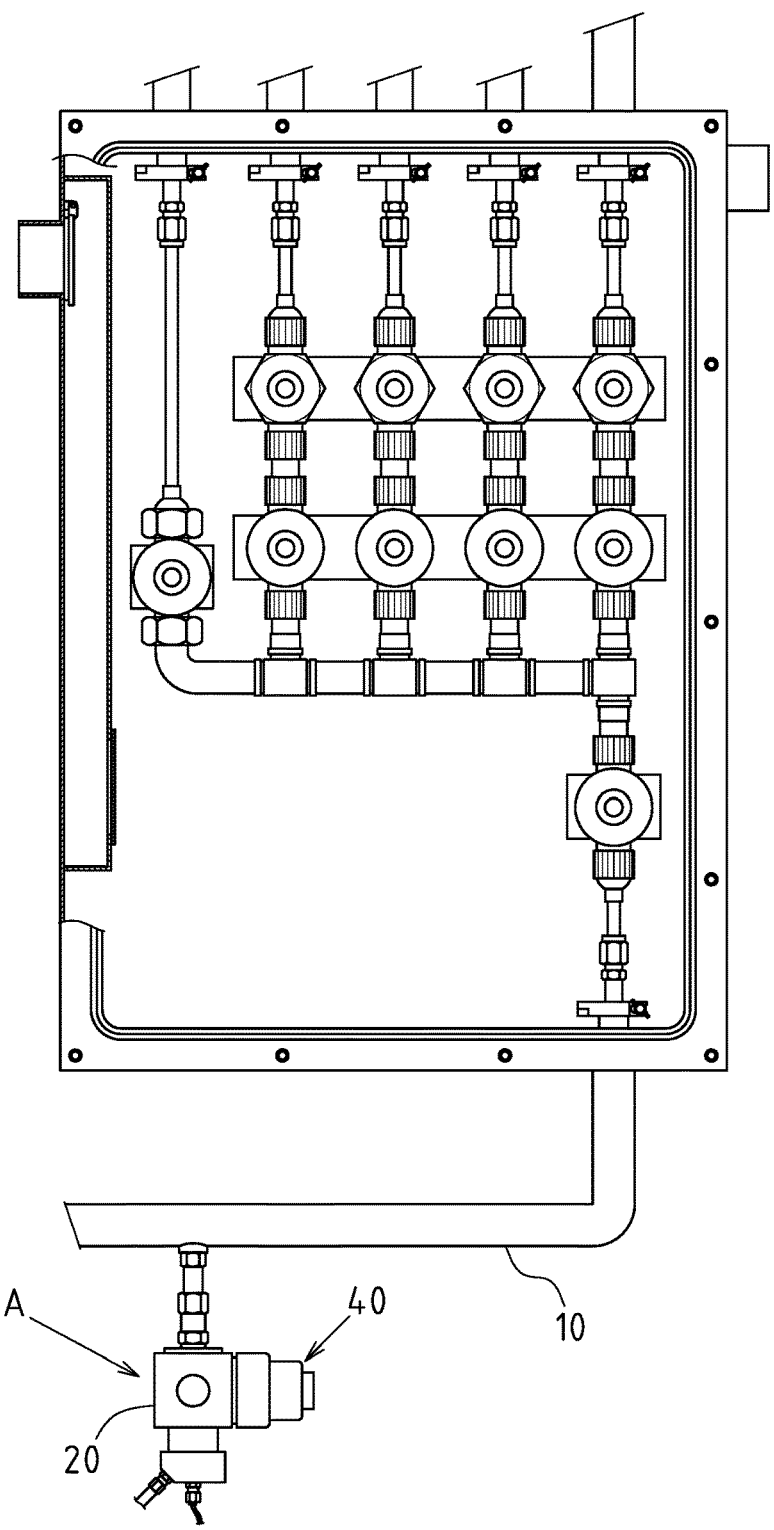
FIG. 1 is a plane view of the embodiment of the present invention of an inner static electricity eliminating control valve installed on the organic solvent delivery pipeline.
Figure 2:
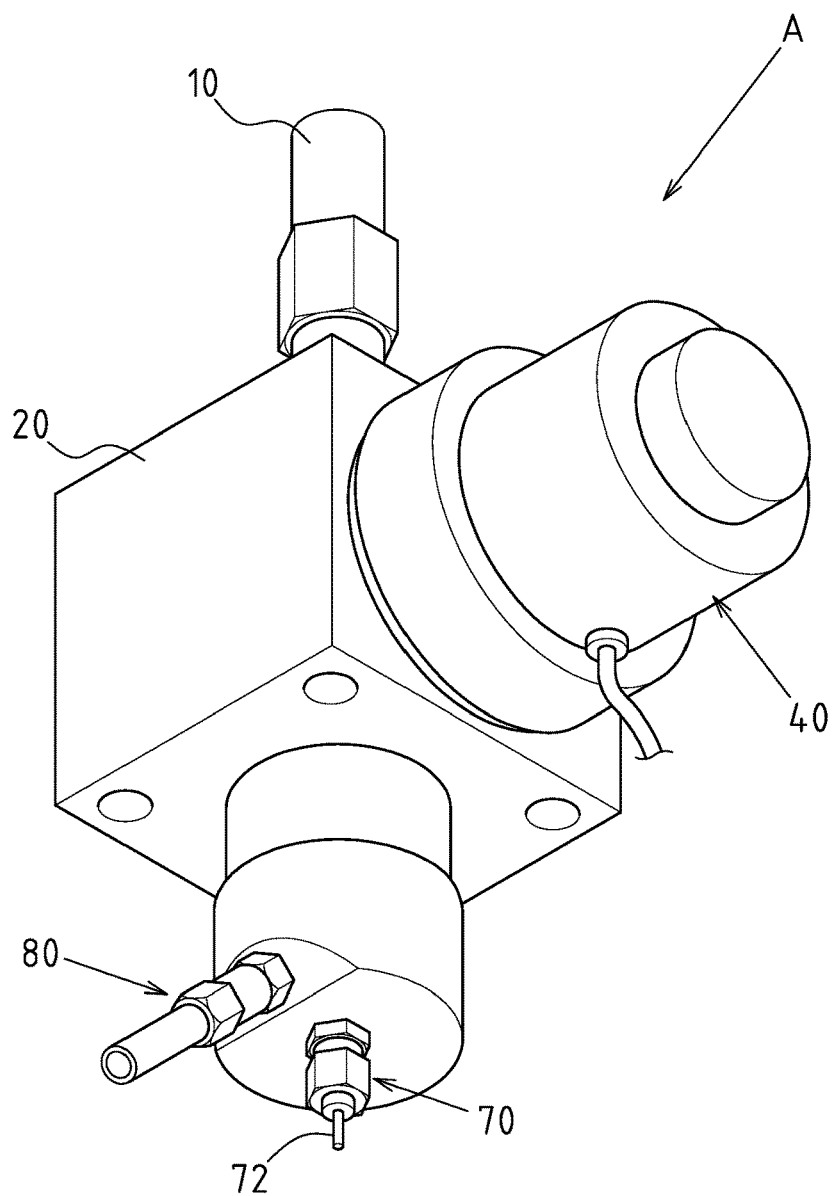
FIG. 2 is an assembled perspective view of a preferred embodiment of the present invention of an inner static electricity eliminating control valve.

FIGS. 1, 2, 3, and 4 are disclosure of a preferred embodiment of the present invention of an inner static electricity eliminating control valve for organic solvent delivery pipelines. However, such preferred embodiment is for descriptive purposes only, and is not intending to limit the scope of patent application. Said inner static electricity eliminating control valve A is to be installed on and connected to an organic solvent delivery pipeline 10 (note: installation is not limited to pipelines inside or outside the manifold), to eliminate the inner static electricity generated by the organic solvent inside the organic solvent delivery pipeline 10.

The inner static electricity eliminating control valve A comprises:

a valve casing 20, including a pipeline connection portion 21, to be installed on and connected to the organic solvent delivery pipeline 10;

a main valve chamber 30, provided inside the valve casing 20, with one side of the main valve chamber 30 communicated to the pipeline connection portion 21, so that the organic solvent can be introduced into the main valve chamber 30 through the pipeline connection portion 21;

a pneumatic actuator 40, provided on the other side of the main valve chamber 30, said pneumatic actuator 40 configured with a pressure applying portion 41 towards the main valve chamber 30, said pressure applying portion 41 can periodically generate pressure towards the organic solvent inside the main valve chamber 30;

a subsidiary valve chamber 50, provided inside the valve casing 20 and separated from the main valve chamber 30 through a separating wall 51;

a check valve 60, provided between the main valve chamber 30 and the subsidiary valve chamber 50, and the checking direction of the check valve 60 is set to allow only one-way flow of the organic solvent from the main valve chamber 30 towards the subsidiary valve chamber 50;

a static electricity export mechanism 70, provided on one side of the subsidiary valve chamber 50, said static electricity export mechanism 70 including a metal static electricity export head 71 configured inside the subsidiary valve chamber 50 and a static electricity conduction wire 72 connected to the metal static electricity export head 71 and extending out of the valve casing 20, the outward extending end of the static electricity conduction wire 72 has a grounding portion 73;

a solvent export portion 80, provided on one side of the subsidiary valve chamber 50 and located at an interval with the static electricity export mechanism 70, said solvent export portion 80 being provided to release and export excessive organic solvent inside the subsidiary valve chamber 50.

Figure 3:
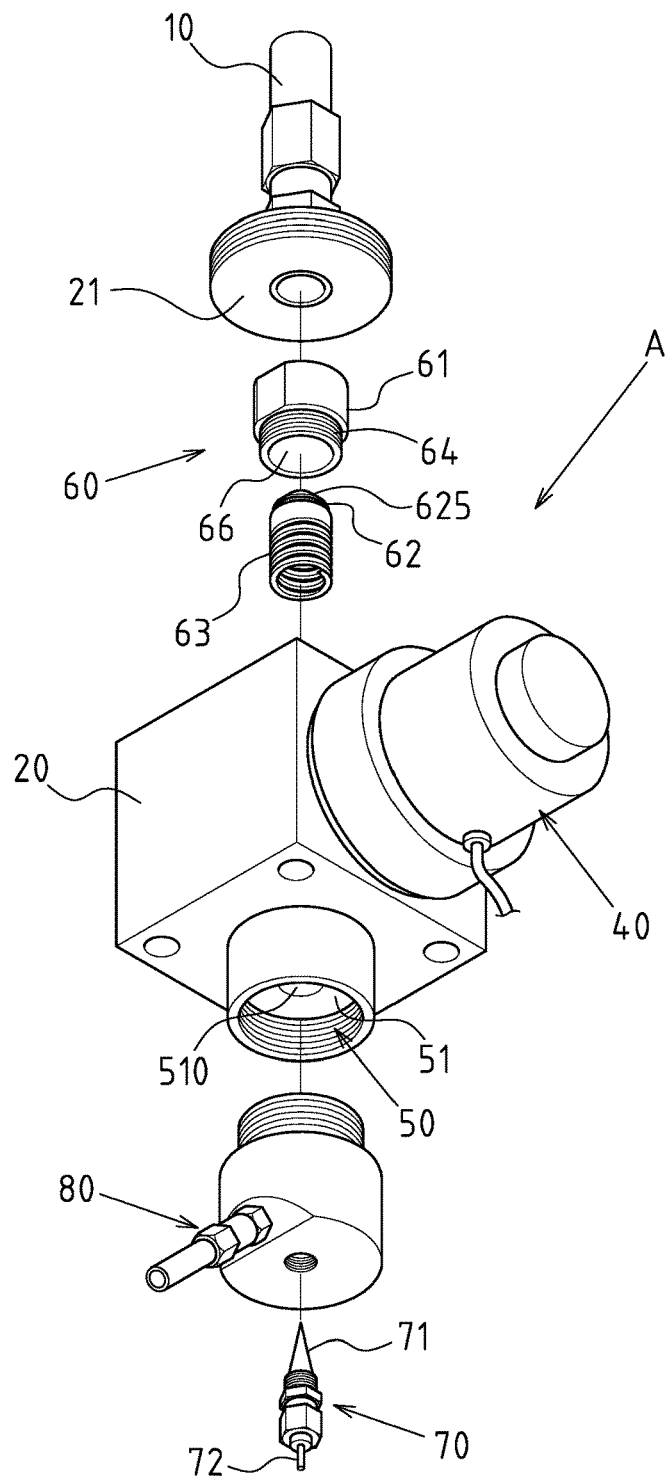
FIG. 3 is an exploded perspective view of a preferred embodiment of the present invention of an inner static electricity eliminating control valve.
Figure 4:
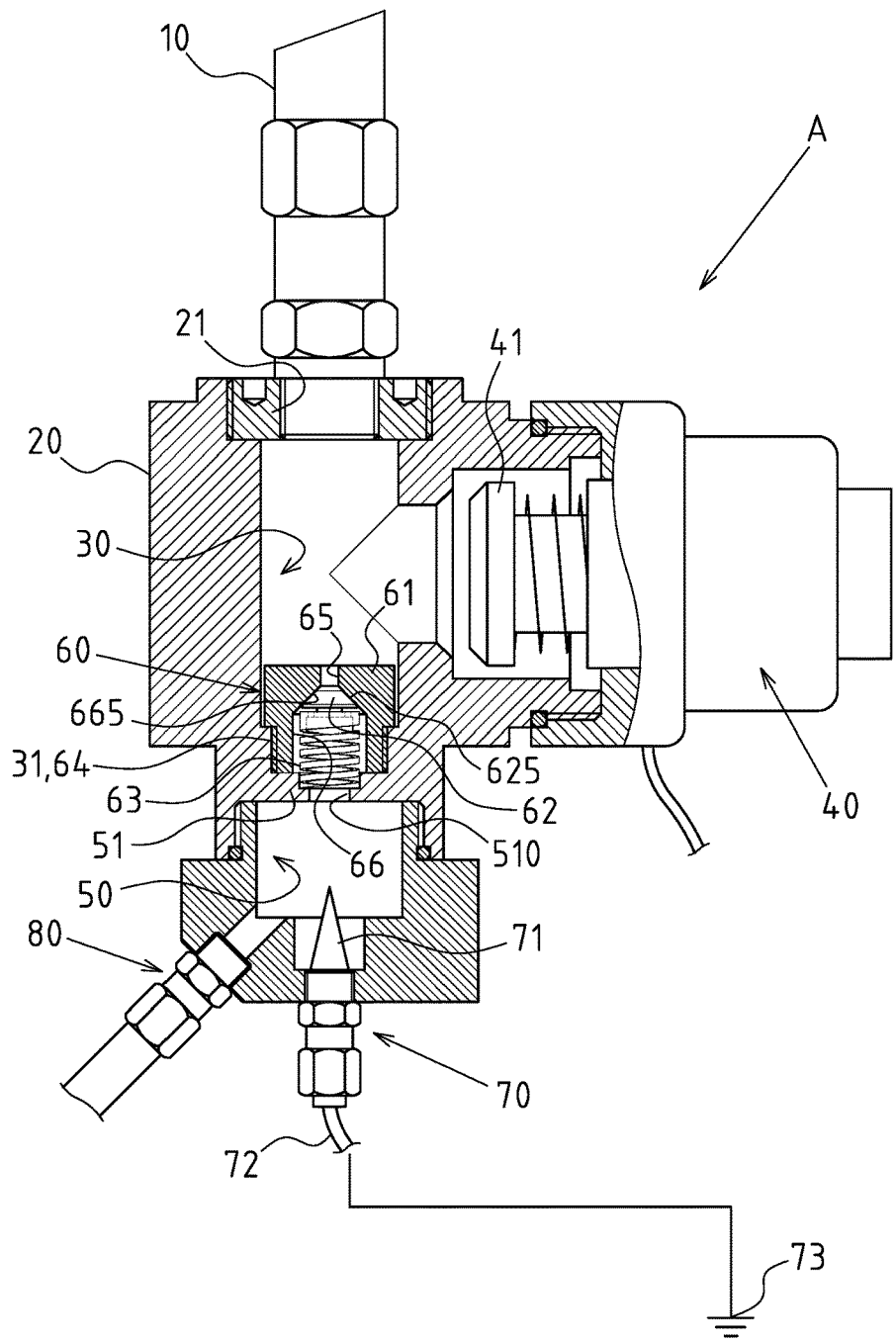
FIG. 4 is an assembled sectional view of a preferred embodiment of the present invention of an inner static electricity eliminating control valve.

Referring to FIGS. 3 and 4, the metal static electricity export head 71 of the static electricity export mechanism 70 can be designed in a conic shape.

In particular, said metal static electricity export head 71 is preferably made of blunt metal material (for example: gold) for a good static electricity export effect.

Referring to FIGS. 3 and 4, the check valve 60 can include a limiting cover 61, a checking cock body 62 and a coil spring 63;

the position of the main valve chamber 30 for installation of the check valve 60 is provided with an inner thread section 31, and the peripheral of one end of the limiting cover 61 of the check valve 60 is provided with an outer thread section 64, for screw joint with the inner thread section 31, such that this end of the limiting cover 61 pushes tightly against the separating wall 51 provided between the main valve chamber 30 and the subsidiary valve chamber 50;

the center of the other end of the limiting cover 61 is provided with a through hole 65, communicated to a holding chamber 66 provided inside the limiting cover 61, the end of the holding chamber 66 corresponding to the through hole 65 is provided with a conic ring wall 665, said checking cock body 62 and coil spring 63 being held inside the holding chamber 66 of the limiting cover 61;

accordingly, the checking cock body 62 has a conic ring rim 625, relatively abutting the conic ring wall 665 provided on the holding chamber 66;

said coil spring 63 is fitted between the checking cock body 62 and the separating wall 51, elastically pushing the checking cock body 62 towards the conic ring wall 665 provided on the holding chamber 66; furthermore, said separating wall 51 is configured with a passing hole 510, communicated to the holding chamber 66 and subsidiary valve chamber 50 provided inside the limiting cover 61.

Particularly, said checking cock body 62 and coil spring 63 can be an integrally formed structure (such as a plastic injection formed style).

Figure 5:
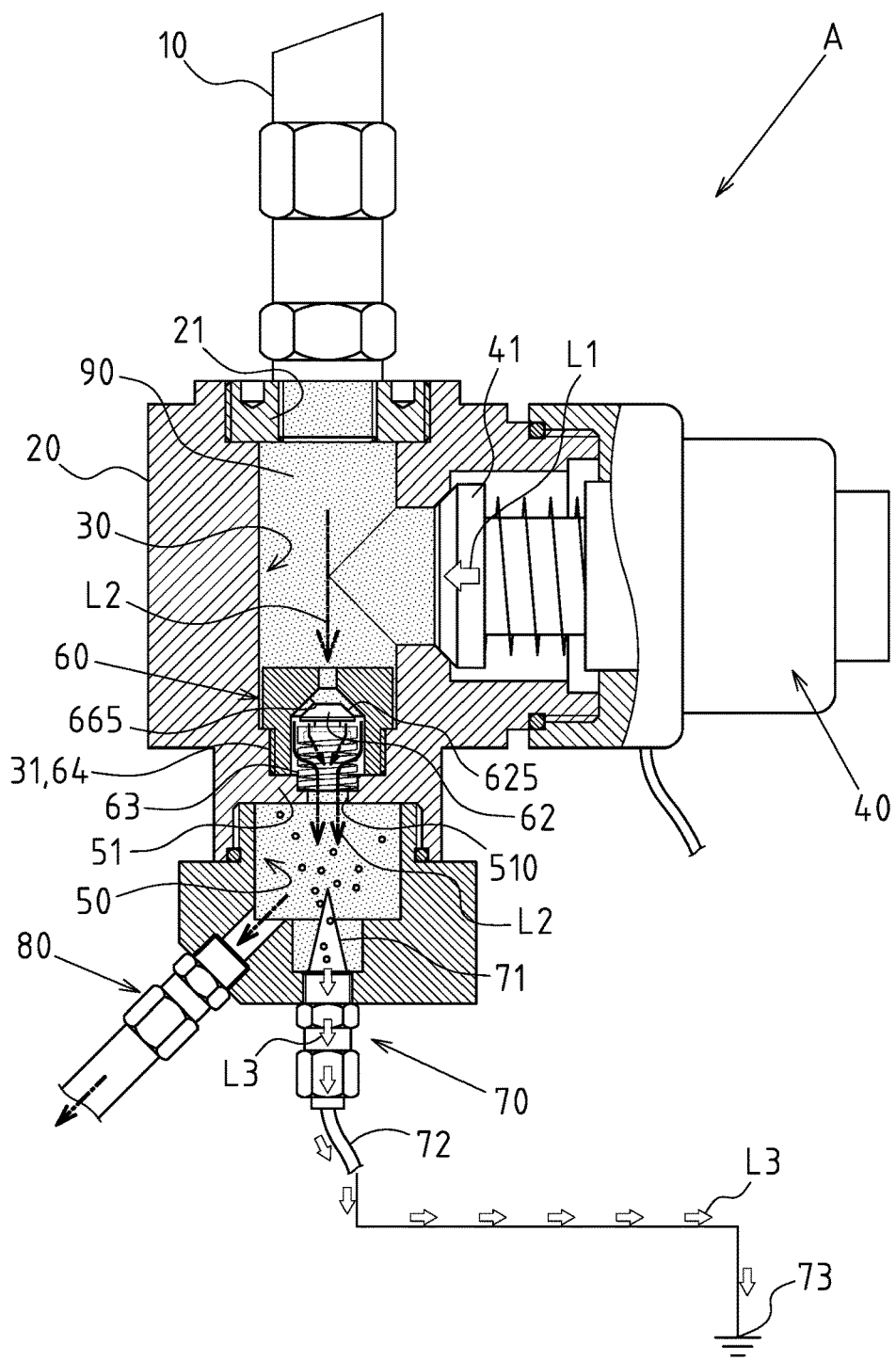
FIG. 5 is a working state view of the present invention of an inner static electricity eliminating control valve.

Based on the above-mentioned structural composition and technical features, the working condition of the preferred embodiment of the present invention is described as below: referring to FIG. 5, because, in application, said inner static electricity eliminating control valve A is to be installed on and connected to the organic solvent delivery pipeline 10, the organic solvent 90 flowing inside the organic solvent delivery pipeline 10 can go through the pipeline connection portion 21 and be introduced into the main valve chamber 30, and the pressure applying portion 41 of the pneumatic actuator 40 will periodically (for example, every 10 seconds or every 1 minute etc) apply a pressure toward the organic solvent 90 inside main valve chamber 30 (as marked by Arrow L1), under the pressure, the organic solvent 90 inside the main valve chamber 30 will be periodically squeezed and be delivered through the check valve 60 to the subsidiary valve chamber 50 (as marked by Arrow L2). During the above-mentioned delivery of the organic solvent 90, the metal static electricity export head 71 of the static electricity export mechanism 70 provided inside the subsidiary valve chamber 50 will export the static electricity existing in the organic solvent 90 (including static electricity existing in the organic solvent 90 inside the organic solvent delivery pipeline 10, the main valve chamber 30 and the subsidiary valve chamber 50), and through the static electricity conduction wire 72 and grounding portion 73, the static electricity is sent to the outside (as marked by Arrow L3). In this way, the present invention achieves a practical effect of eliminating the inner static electricity inside the organic solvent delivery pipeline 10.

Moreover, when the pressure applying portion 41 of the pneumatic actuator 40 stops applying pressure, because the checking cock body 62 inside the check valve 60 will be elastically pushed back by the coil spring 63 to restore the closed state, so that the organic solvent 90 will not lose dramatically, but be emitted periodically in small quantities.

We claim:

1. An inner static electricity eliminating control valve for installation onto or connection to an organic solvent delivery pipeline and for eliminating inner static electricity generated by an organic solvent inside the organic solvent delivery pipeline, the inner static electricity eliminating control valve comprising:

a valve casing having a pipeline connection portion adapted to be installed on and connected to the organic solvent delivery pipeline;

a main valve chamber positioned within said valve casing, wherein one side of said main valve chamber communicates with the pipeline connection portion such that the organic solvent can pass through the pipeline connection portion and introduced into the main valve chamber;

a pneumatic actuator positioned on another side of said main valve chamber, said pneumatic actuator having a pressure applying portion towards the main valve chamber, said pressure applying portion adapted to periodically generate pressure towards the organic solvent inside said main valve chamber;

a subsidiary valve chamber positioned inside said valve casing and separated from said main valve chamber by a separating wall;

a check valve located between said main valve chamber and said subsidiary valve chamber, wherein a checking direction of said check valve is set to allow a only one-way flow of the organic solvent from said main valve chamber towards said subsidiary valve chamber;

a static electricity export mechanism positioned on one side of said subsidiary valve chamber, said static electricity export mechanism having a static electricity export head located inside said subsidiary valve chamber and a static electricity conduction wire connected to said metal static electricity export head and extending out of said valve casing, wherein an outwardly extending end of said static electricity conduction wire has a grounding portion; and a solvent export portion positioned on one side of said subsidiary valve chamber and spaced from said static electricity export mechanism, said solvent export portion adapted to release and export excessive organic solvent inside said subsidiary valve chamber.

2. The inner static electricity eliminating control valve of claim 1, wherein said static electricity export head of said static electricity export mechanism has a conic shape.

3. The inner static electricity eliminating control valve of claim 2, wherein said static electricity export head is formed of a metal material.

4. The inner static electricity eliminating control valve of claim 3, wherein said check valve has a limiting cover, a checking cock body and a coil spring, a portion of said main valve chamber having an inner thread section, a periphery of one end of said limiting cover of said check valve having an outer thread section, said outer thread section being threadedly secured to said inner thread section such that the end of said limiting cover pushes tightly against said separating wall between said main valve chamber and said subsidiary valve chamber, a center of another end of said limiting cover having a through hole communicating with a holding chamber inside said limiting cover, an end of said holding chamber corresponding to the through hole having a conic ring wall, said checking cock body and said coil spring being held inside said holding chamber of said limiting cover, wherein said checking cock body has a conic ring rim abutting said conic ring wall of said holding chamber, wherein said coil spring is fitted between said checking cock body and said separating wall so as to elastically push said checking cock body towards said conic ring wall of said holding chamber, and wherein said separating wall has a passing hole communicating with said holding chamber and said subsidiary valve chamber.

5. The inner static electricity eliminating control valve of claim 4, wherein said checking cock body and said coil spring are integrally formed.

\* \* \* \* \*